Patented Nov. 11, 1924.

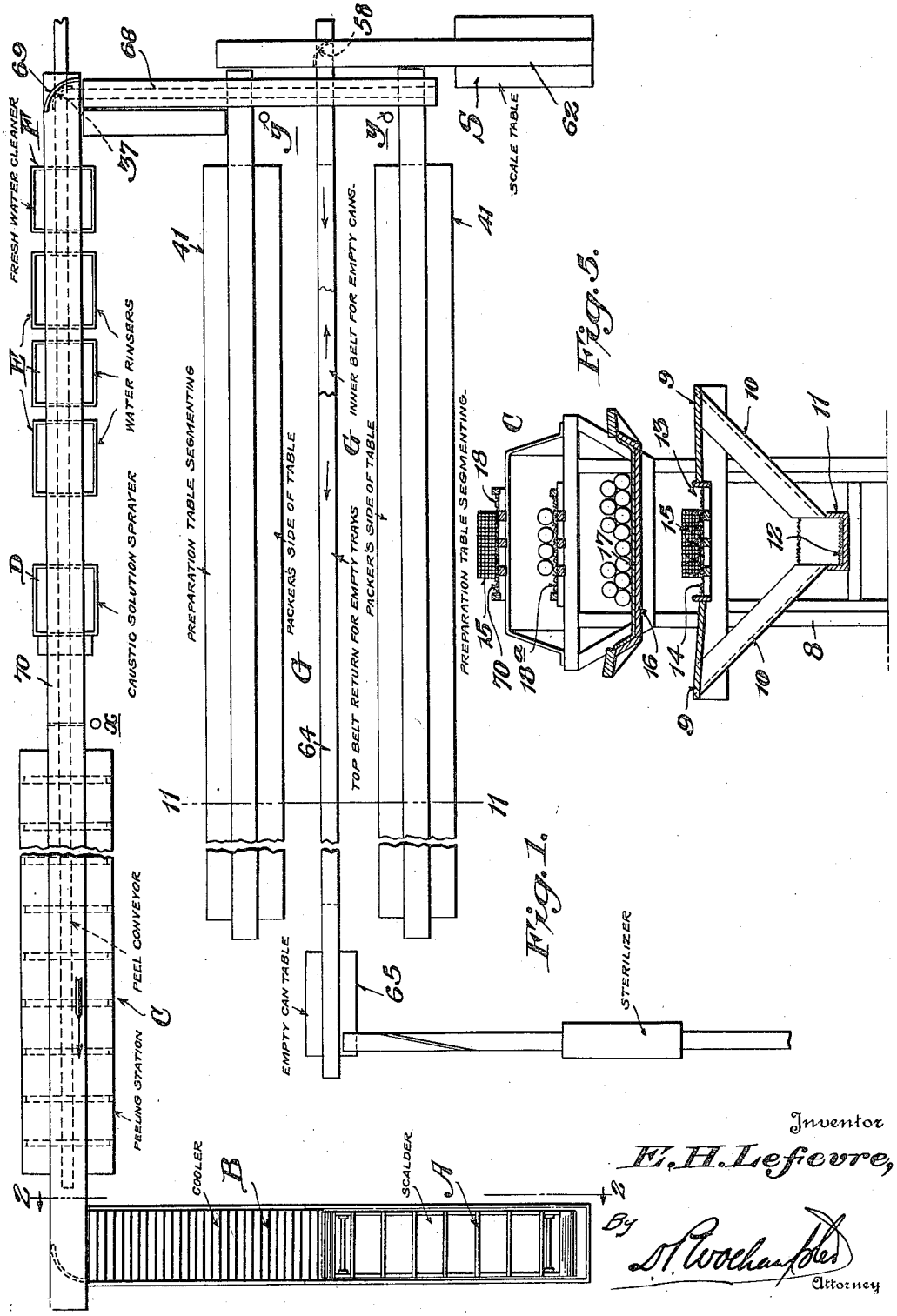

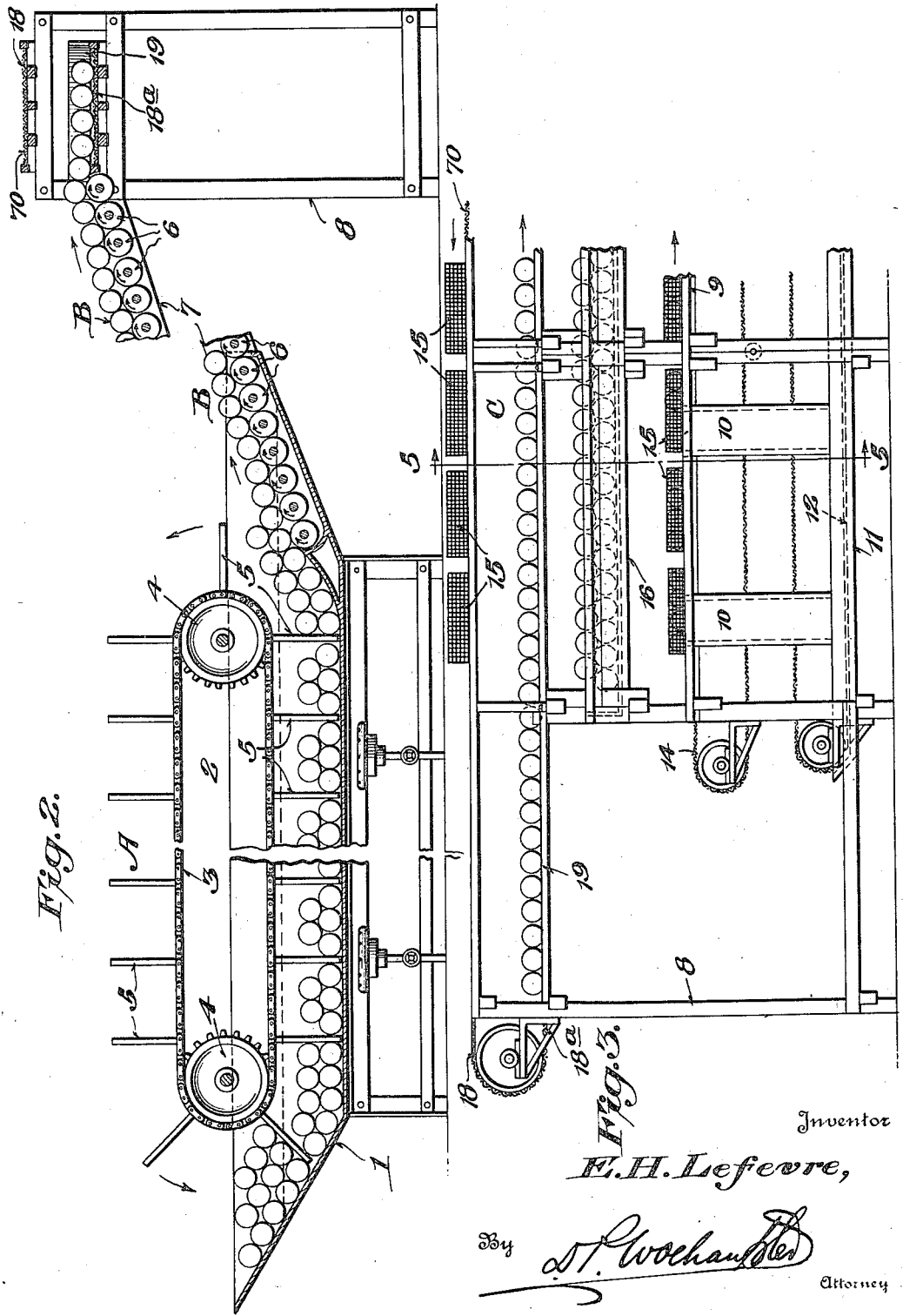

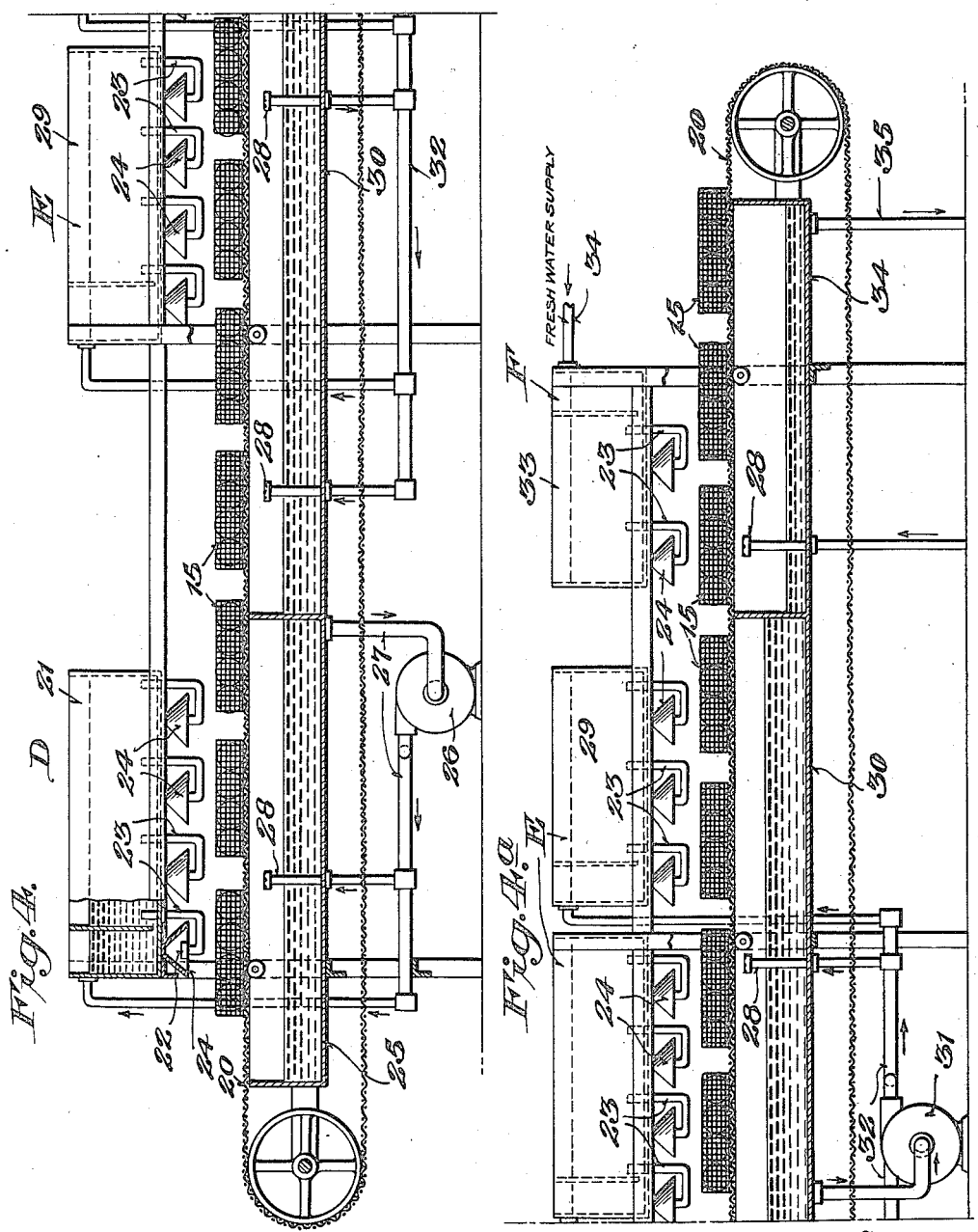

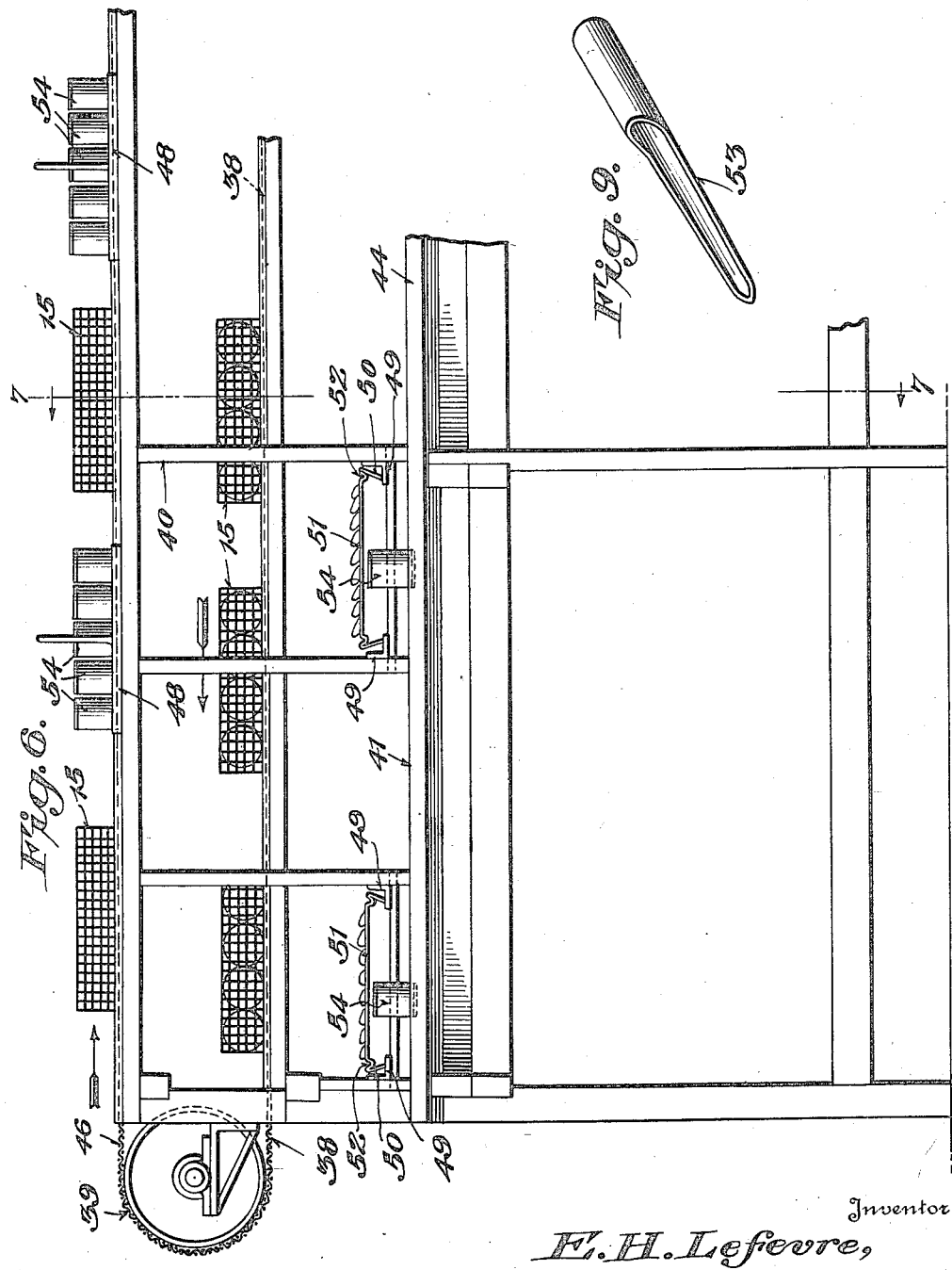

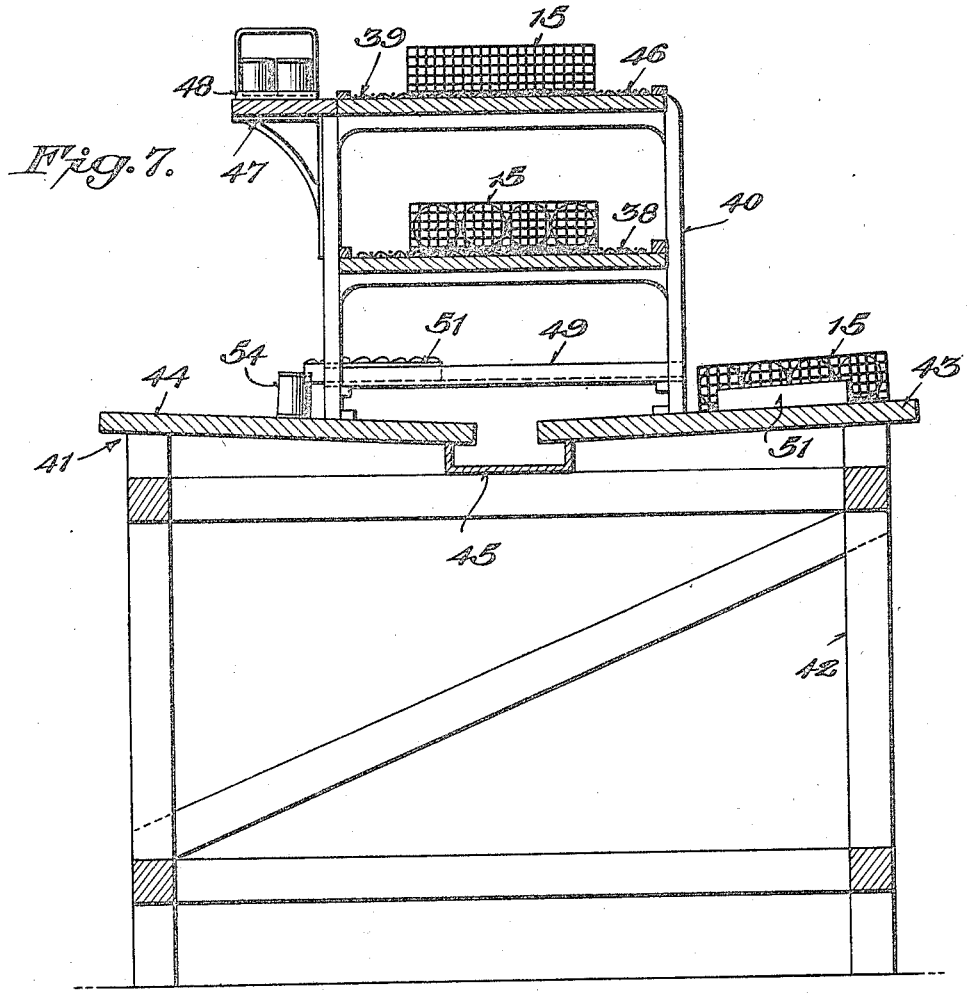
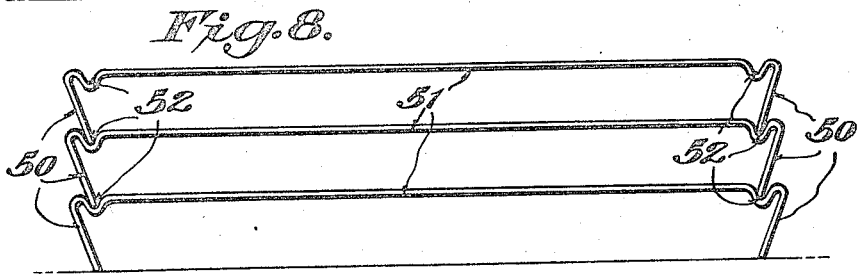

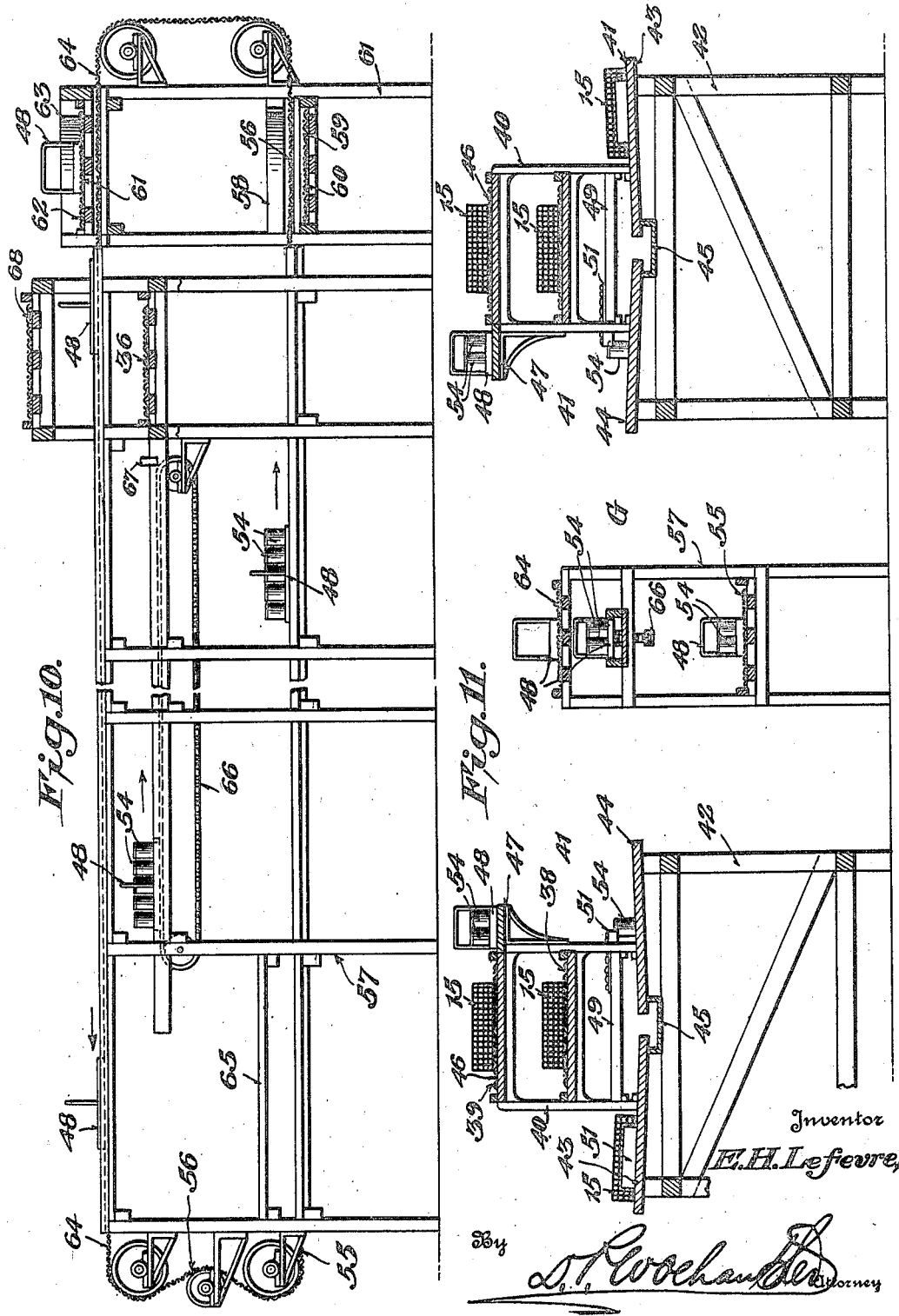

1,514,774

UNITED STATES PATENT OFFICE.

EUGENE H. LEFEVRE, OF AVON PARK, FLORIDA, ASSIGNOR TO AVON CANNING COMPANY, OF AVON PARK, FLORIDA, A CORPORATION OF FLORIDA.

PROCESS AND APPARATUS FOR CANNING CITRUS FRUIT.

Application filed August 20, 1924. Serial No. 733,244.

*To all whom it may concern:*

Be it known that I, EUGENE H. LEFEVRE, a citizen of the United States, residing at Avon Park, in the county of Highlands and State of Florida, have invented certain new and useful Improvements in Processes and Apparatus for Canning Citrus Fruit, of which the following is a specification.

This invention relates to the preparation and canning of citrus fruit, more particularly the hearts or segments of grapefruit sometimes termed pomelo.

The canning of grapefruit has been in its experimental stage until the advent of the present invention. Many difficult problems have confronted the canner in preparing the hearts or segments of the grapefruit in a manner that will not injure the tender structure thereof, so as to obviate decay or deterioration after canning. Also considerable trouble has been experienced, in the processes heretofore attempted, in obtaining whole hearts or segments which will neatly and firmly pack in the can and will survive the rough handling incident to transportation and selling.

The ordinary processes and apparatus heretofore used for the preparation and canning of fruits and vegetables will not answer for successfully preparing and canning grapefruit for the market, and it has been necessary to solve the problems of preparing and canning grapefruit from an original study of the peculiar characteristics of this fruit and the requirements which necessarily must be complied with in order to obtain a canned product of that kind that could stand the usages of trade, and reach the table of the consumer in an attractive and palatable condition.

The present invention has been in successful operation under actual factory conditions and has achieved its principal object of providing a novel process by means of which the fruit first can be peeled in a manner that will not cause bleeding or other injury to the fine superficial textures of the fruit, leaving the ball of fruit in a condition and form well adapted for withstanding the subsequent treatment of loosening the "rag" about the ball of fruit, and the membrane or adhesions between the segments constituting the socalled "hearts". Also, the invention has for its object a novel and economical way of handling the ball of fruit thus treated to facilitate and expedite the opening up of the ball into its individual segments or heart and introducing the latter into the cans. Furthermore, in that connection the invention contemplates a novel disposition and construction of the various tables and conveyors where the peeling, segmenting and can filling operations occur in order that the work of the operators may be performed with the least amount of effort and expenditure of time, while also convenient and desirable points of inspection are provided so that wastage is reduced to a minimum, and the very best sanitary conditions observed and maintained.

With these and other objects in view which will be apparent to those familiar with this new industry the invention consists in the novel process steps and novel apparatus hereinafter more fully described, illustrated and claimed.

Though susceptible of a wide range of modification without departing from the spirit of the invention a preferred and practical embodiment of the process as well as of the apparatus are exemplified in the accompanying drawings in which—

Figure 1 is a diagrammatic plan view showing the lay-out of the complete apparatus.

Figure 2 is a sectional view of the scalding and cooling units, as indicated by the line 2—2 on Figure 1.

Figure 3 is a detail elevation of an end portion of the peeling unit.

Figures 4 and 4ª are broken views, in section of the alkali and washing stations for the peeled fruit.

Figure 5 is a cross-sectional view of the peeling unit on the line 5—5 of Fig. 3.

Figure 6 is an elevation of an end portion of the segmenting and packing table.

Figure 7 is a cross-sectional view of a packing table on the line 7—7 of Figure 6.

Figure 8 is a detail view showing a stack of the fruit segment trays used in the combined segmenting and packing tables.

Figure 9 is a detail view showing the preferable form of segmenting scalpel employed in opening the ball of fruit.

Figure 10 is an elevation of the can supply unit between a pair of segmenting and packing tables.

Figure 11 is a cross-sectional view on the line 11—11 of Figure 1 showing the relation of two segmenting and packing tables to a common can supply unit between them.

In carrying forward the present invention a preliminary step of the process is to subject the ripe fruit to a scalding treatment having the effect of loosening the peel from the inside ball of the fruit, as well as initiating the softening of the "rag" between the inner surface of the skin and the ball of fruit, and the "rag" adhering to the ball of fruit. This scalding treatment is preferably performed in a scalding device or scalding unit designated generally by the letter A and consisting of an open vat 1 containing water and through which vat travels a propelling conveyor 2. The propelling conveyor essentially consists of the endless belts 3 traveling over suitably driven sprockets 4 and carrying the propeller blades 5 which have a sweeping movement over the bottom of the vat 1 and through the water therein. The distance between the propeller blades 5 is preferably sufficient to provide a space between every pair of such blades which is of a sufficient capacity to accommodate a whole box of grapefruit, so that in operation the scalding device or unit is treating several box-fuls of grapefruit at one time.

The water in the vat 1 is preferably kept at a temperature of not less than the boiling point, and the movement of the conveyor 2 is sufficiently slow so that it will take a period of from three to five minutes, according to the atmospheric temperature and size of the grapefruit to convey each batch of the fruit from the receiving end of the scalding unit to the delivery end at which latter end of the scalding unit there is arranged a cooler unit designated generally by the reference letter B.

The cooler unit B may be of any preferred construction but preferably consists of an inclined series of suitably driven rollers 6 arranged in an upwardly inclining open chute 7 extending from the delivery end of the vat to the receiving platform of the peeling station, presently to be referred to. The cooler unit is open and exposed to atmospheric temperature, and during the passage of the fruit upwardly on this unit it cools down to a temperature of approximately 150° Fahrenheit, that is until it is sufficiently cool to be comfortably handled by the peelers at the peeling station designated generally by the reference letter C. The exposed rotating rollers 6 function to turn and lift the fruit thereby acting both as conveyors and as a means to facilitate uniform pre-cooling of the fruit before it is handled by the peelers at the peeling station.

The peeling station C in the plant lay-out shown in the drawings may be conveniently arranged at right angles to the scalding and cooling units, and preferably is of the construction shown in Figures 3 and 5 of the drawings. Referring thereto it will be seen that in its structural formation the peeling station C includes in its general organization a suitable frame work 8 supporting upon opposite sides thereof the work tables 9 of any desired length according to the required capacity of the cannery, and each work table has associated therewith at the required intervals where the workers are located the inclined waste chutes 10 extending downwardly and inwardly to a common peelings trough 11 adapted to receive the peelings from the peeling operation preferably having associated therewith a suitably operated conveyor 12 which carries the peelings to a discharging point where they are collected, preferably for use as a by-product in making a candied peel.

Between the work tables 9 of the peeling station C the latter is constructed with a feeding runway 13 in which is arranged a carrier belt 14 upon which is adapted to be placed the wire or foraminous fruit holding baskets 15 into which are placed the balls of fruit after the peeler has removed the skin or peel, and the said carrier or carrier belt 14 carries the baskets of peeled fruit to the next station in the lay-out, where the same are subjected to the chemical treatment hereinafter referred to.

In addition to the features referred to the peeling station C has constructed within the top part thereof a fruit bin 16 having a canvas or equivalent soft body portion 17 so that the unpeeled fruit can be thrown into the bin, and held in reserve therein for the workers without injury to the fruit. And, above the fruit bin 16 the peeling station has mounted therein the upper and lower runs 18 and 18$^a$ respectively of a wire mesh or equivalent conveyor which is employed respectively for the return to the peeling station of the fruit baskets 15, and for advancing the warm fruit along the peeling station so that the operators or peelers can remove the fruit from the said lower run 18$^a$ of the conveyor and place it temporarily in the fruit bin 16. In this connection it will be observed that the lower conveyor run 18$^a$ contiguous to one end of the frame work 8 constitutes a receiving platform 19 onto which the fruit is delivered from the upper end of the cooler unit B as plainly shown at the right hand end of Figure 2 of the drawings.

The warm fruit, at the peeling station is peeled in a particular manner. That is to say it is not sliced nor whittled by shaving off the peel with the attendant danger of causing bleeding of the fruit and considerable waste. As distinguished from that undesirable method the operator at the peeling station slits the peel or skin four ways in a manner similar to the quartering of an apple and for that purpose uses a very short knife point or blade that only penetrates the peel or skin. After that is done the skin or peel freely strips off of the ball of fruit without tearing or injuring the latter in the slightest degree. That is made possible by the preliminary steps of scalding and cooling above referred to.

The balls of fruit, after peeling, still have adhering thereto the thin membrane commonly called the "rag" which must be removed before the segments can be separated. Heretofore this has been attempted by peeling off with a knife and that operation also causes bleeding of the fruit and considerable waste. To accomplish that desirable result and also to soften the membrane or tissues which cause adhesion between the segments or hearts of the grapefruit the present invention provides for following the peeling operation with a chemical treatment of the balls of peeled fruit in the foraminous baskets 15. In other words the baskets 15 of peeled fruit are carried along by the carrier or conveyor 14 to an inspection point $x$, where the same can first be inspected and then placed on the upper run of a fabric or equivalent foraminous conveyor belt 20 and as the baskets of peeled fruit are carried along by the conveyor 20 they are subjected successively to an alkali bath and to a water cleansing bath. The alkali solution, for the alkali bath preferably consist of a 5% solution of caustic soda and this solution is contained in a chemical tank 21. This chemical tank may be conveniently arranged above the belt 20 and is equipped with a plurality of spray devices. Each of these spray devices preferably is of special construction and consists of an upturned discharge nozzle 22 having a pipe connection 23 with the interior of the tank 21 and an approximately conical inverted shower hood 24 arranged over the nozzle 22.

The special arrangement of the nozzle 22 and the hood 24 provides for a very gentle, pressureless, shower or flow of the liquid over the fruit in the baskets. It has been found that direct sprays of the chemical, even under slight pressure is very undesirable and causes penetration of the fruit ball that starts decay and deterioration. Accordingly it is an important phase of the process of the present invention not to spray the fruit balls under pressure but on the contrary to provide for a gentle fall or flow of the liquid over the fruit through the baskets, and through the conveyor 20 into a catch basin or tub 25 from which the solution is returned to the tank 21 by means of a suitable pump 26 and a piping system 27, as indicated by the arrows on Figure 4 of the drawings. The flowing of the caustic solution over and about the balls of fruit may be supplemented if desired by employing a supplemental spray device or nozzle 28 connected with the piping system of the pump 26 and arranged at a predetermined distance below the belt 20 so that the latter will act as a baffle for the upstream from the nozzle 28, but permit the caustic to reach the fruit through the bottoms of the basket.

The one conveyor belt 20 carries the baskets of peeled fruit past the chemical station to a primary series of washing units E acting as rinsers and in these units the wash water is reused at least several times. Furthermore for the sake of uniformity in manufacture, and results to be obtained, each unit or rinser E is similar in construction and fittings to the chemical unit D. That is to say each washing or rinser unit E consists of a water tank 29 equipped with spray devices like those described, a catch basin or tub 30, a circulating pump 31, piping system 32 and supplemental spray devices 38 like the spray device 28 previously described.

Beyond the washing or rinsing units E a final washing unit F is associated with the conveyor belt 20, and fresh water, which is not reused is employed in that final washing unit. The said final washing unit includes a fresh water tank 33 equipped with spray devices, similar to those described and continuously receiving a fresh water supply through an inlet 34, and discharging through the spray devices and the baskets of fruit and the conveyor 20 into a catch basin 34 which has a suitable outlet 35 and may if desired be equipped with a supplemental spray device 28 like those previously described.

The chemical treatment in the unit B serves to loosen the "rag" or membrane on the ball of fruit as well as to soften the membrane or ligaments holding together the segments or hearts of the fruit, and after all traces of the caustic solution have been removed from the balls of fruit by the rinsing and final washing operations the baskets of fruit are carried by the conveyor belt 20 onto a cross conveyor 36 (Figure 10), being directed on to the latter by a curved guide 37, and from the cross conveyor 36 the baskets of peeled, chemically treated and washed fruit are deposited on the lower run 38 of a conveyor belt 39 (Figs. 6 and 7), driven in any suitable manner and mounted within the upper frame work 40 of a combined segmenting and packing table 41. In the lay-out illustrated in Figures 1 and 11 of the drawings, a pair of said tables 41 are advantageously employed in spaced parallel relation with a can supply unit G located between the said tables and serving both of them.

Each combined segmenting and packing table 41 is preferably constructed as shown in Figures 6, 7 and 11 of the drawings the same consisting of a base frame 42 supporting the oppositely arranged work tables 43 and 44 respectively for the segmenters and the packers and both of which incline downwardly and inwardly to a centrally arranged drain or waste trough 45 to receive drippings and any discarded material. The superstructure or upper frame work 40 supports at the top thereof the upper run 46 of the belt 39, and also has mounted at the side thereof a supporting bracket 47 above the points where the packers are stationed and adapted to temporarily hold thereon the trays 48 of empty cans for the use of the packer operating on the table 44. Furthermore the upper frame work 40, below the belt run 38 and at each worker's station is provided with the transverse guideways 49 adapted to slidably support the downward side flanges 50 of the fruit segment trays 51. Contiguous to their flanged side edges each of these trays is preferably grooved as at 52 to permit of the stacking of a number of these trays as shown in Figure 8 of the drawings should this become necessary or desirable in the operation of the factory.

In using the combined segmenting and packing unit 41 each segmenter working over the table 43 takes a basket of the previously peeled and treated fruit from the lower run of the conveyor belt 39 and places it on the table 43, and then opens each ball of fruit preferably by means of a bamboo scalpel 53 of the type shown in Figure 9 of the drawings. This tool when inserted in the end of the ball of fruit opens up the ball and by a slight twisting movement of the tool the segments or hearts of the ball will fall apart and can be placed on the fruit segment trays 51 which are then introduced into the guideway 49 and slid over to the packer's side of the unit where each packer working over the table 44 can take the fruit segments or hearts from the tray 51 and place them in the cans 54.

As previously noted, a supply of empty cans with a sugar content previously placed therein is conveniently accessible to the packer from the bracket 47, and after the supply of cans has been filled by the packer, the same, in the trays are placed on the lower run 55 of a conveyor belt 56 mounted to be driven through and over the frame work 57 of the can supply unit G previously referred to. The conveyor run 55 carries the tray of filled cans to a point where the guide or equivalent device 58 deflects the same onto the lower run 59 of a conveyor belt 60 operating in a cross conveyor stand 61 located at the end of the unit G and extending to a scale table S where the weighing of the filled cans takes place before they are delivered to the canning machinery which forms no part of the present invention. The upper run 62 of the belt 60 is intended to receive the empty trays 48 from the scale table station and to carry them back to a point where they are deflected by a guide or equivalent device onto the upper run 64 of the conveyor belt 56 and are carried by said conveyor run 64 back to the empty can table 65. At this point an operator again places empty cans into the can tray 48 after depositing in the cans the sugar content. After doing that the trays of sugared cans are placed on the upper run of a supply conveyor 66 running at slow speed through the frame work 57 of the can supply unit G so that they may be taken off by the packers and placed on the brackets 47. A stop 67 at one end of the conveyor 66 will serve to arrest movement of the trays of sugared cans if not removed by a packer before reaching that point.

When the segmenter at the table 43 empties a fruit basket 15 such empty basket is placed on the upper run 46 of the belt 39 and is carried thereby to a point where it is guided on to the cross top return belt 68, and the latter carries the empty basket to a point where it is directed at 69 onto the top return belt 70 which closely connectes with or is a continuation of the upper conveyor run 18 extending over the peeling station. At the end of each combined segmenting and packing unit 41, as at y, inspection points may advantageously be provided for an inspector.

I claim:—

1. A process for preparing citrus fruit for canning which consists first in scalding the fruit and subsequently stripping the whole peel from the ball of fruit and then subjecting the latter successively to a solution of alkali and wash water.

2. A process for preparing citrus fruit for canning which consists in successively scalding and cooling the fruit and subsequently stripping the whole peel from the ball of fruit and then subjecting the latter successively to alkali and water.

3. A process for preparing citrus fruit for canning which consists in successively scalding and cooling the fruit, stripping the whole peel from the ball of fruit and then subjecting the ball of fruit successively to a solution of alkali and to wash water.

4. A process for preparing citrus fruit for canning which consists in first scalding the fruit, then stripping the whole peel from the ball of fruit, next subjecting the ball of fruit to an alkali solution and finally opening the ball of fruit to separate the individual segments or hearts for insertion into the cans.

5. A process for preparing citrus fruit for canning which consists in successively scalding and cooling the fruit, stripping the whole peel from the ball of fruit, subjecting the ball of fruit successively to a solution of alkali and wash water, and finally opening the ball of fruit to separate the individual segments for the cans.

6. A process for preparing citrus fruit for canning which consists in preliminarily removing the peel by stripping it from the ball of fruit and subsequently flowing the caustic solution without pressure, over the ball of fruit preliminary to opening the latter.

7. A process for preparing citrus fruit for canning which consists preliminarily in removing the peel by stripping it from the ball of fruit, and subsequently subjecting the ball of fruit successively to a substantially pressureless flow of alkali and wash water.

8. A process for preparing citrus fruit for canning which consists first in successively scalding and cooling the fruit, then stripping the whole peel from the ball of fruit, passing the ball of fruit successively through baths of alkali and water and finally opening the individual balls and placing the resulting segments or hearts into cans.

9. An apparatus for preparing citrus fruit for canning including a scalding vat having propelling means therein, an elevating cooling unit arranged at the delivery end of the scalding vat, a feeding unit having peeling tables, a conveyor run-way for the peeled balls of fruit and conveyor means for the return of empty containers for the balls of fruit, and means for subjecting the balls of fruit to chemical action and washing after leaving the peeling unit.

10. An apparatus for canning citrus fruit comprising means for preliminarily scalding and cooling the fruit, and a peeling unit comprising a frame-work having oppositely arranged peeling tables, a conveyor run-way between said tables for containers holding peeled balls of fruit, a storage bin above said run-way and conveyor means for receiving the unpeeled fruit and for returning the containers for the balls of fruit.

11. An apparatus for canning citrus fruit comprising means for preliminarily scalding and cooling the fruit, and a peeling unit consisting of a frame-work having therein oppositely arranged peeling tables, waste chutes in communication with said tables, a conveyor run-way between said tables for carrying the containers holding the peeled balls of fruit, a storage bin above said run-way and conveyor means above the storage bin for respectively receiving the unpeeled fruit and for returning the containers for the peeled balls of fruit.

12. An apparatus comprising a peeling unit having conveyor means for foraminous containers for the peeled balls of fruit, and a chemical treatment unit including a conveyor for said foraminous containers and means for gently flowing a chemical through said container and over and about the peeled balls of fruit therein.

13. An apparatus comprising a peeling unit having conveying means for containers carrying the peeled balls of fruit, and a combined chemical treatment and washing unit including conveying means for the containers carrying the peeled balls of fruit, and a chemical and wash water tanks provided with discharging means for gently flowing the chemical and water over and about the fruit as it is carried along by said conveying means.

14. An apparatus comprising a peeling unit having conveying means for the peeled balls of fruit and a combined chemical treatment and washing unit including conveying means for said containers, catch basins below said conveying means and a plurality of tanks for chemical and wash water arranged above said conveying means, each of said tanks being provided at the bottom with spray devices including shower hoods for gently flowing the liquid over and about the fruit, one of said tanks being provided with a continuous fresh water supply.

15. An apparatus comprising a peeling unit, a combined chemical treatment and washing unit, conveying means for carrying the peeled balls of fruit from the peeling unit to and through the combined chemical and washing unit, a combined segmenting and packing unit arranged to receive the peeled and treated fruit from the chemical and washing unit.

16. An apparatus comprising a peeling unit, a combined chemical and washing unit, foraminous baskets adapted to hold the peeled balls of fruit, conveying means for carrying said baskets from the peeling unit through and past the chemical and washing unit, combined segmenting and packing units adapted to receive the baskets of peeled fruit, and a can supply unit operating between a pair of the combined segmenting and packing units.

17. An apparatus comprising a peeling unit, a combined chemical and washing unit following the peeling unit, and a combined segmenting and packing unit arranged to receive the fruit from the chemical and washing unit, said segmenting and packing unit including oppositely arranged work tables respectively for the segmenters and the packers, a guide-way between the two tables and a fruit segmenting tray adapted to be supported and guided by the said guide-way.

18. An apparatus for preparing citrus fruit for canning including a combined segmenting and packing table comprising a frame-work having oppositely arranged work tables respectively for the segmenters and the packers, a super-structure having a transverse guide-way, and conveyor means respectively for the peeled and chemically treated balls of fruit and for the return of the empty containers for the balls of fruit, and a fruit segment tray adapted to slidably engage said guide-way.

19. In an apparatus for handling fruit for packing including a combined segmenting and packing table having a guide-way from one side of the table to the other, and a fruit segment tray adapted to slidably engage said guide-way.

20. In an apparatus for handling fruit for packing including a combined segmenting and packing table having a guide-way from one side of the table to the other, and a flanged fruit segment tray adapted to slidably engage said guide-way.

21. An apparatus for handling fruit for canning including a combined segmenting and can packing table comprising a framework having oppositely arranged work tables respectively for the segmenters and packers, a waste trough between the said two tables and a super-structure having a support for the empty can tray, a transverse guide-way and conveying means respectively for the peeled and treated fruit and for the return of the empty containers for the peeled fruit.

22. In an apparatus of the class described, means for preliminarily peeling and chemically treating the fruit, a combined segmenting and can packing table arranged to receive the peeled and treated fruit, and a can supply unit paralleling the segmenting and can packing table and including means for feeding a supply of sugared cans to the can packing side of the combined segmenting and can packing table, conveying means for carrying and delivering the filled cans in trays to the scale table and means for returning the empty can trays to a station for re-filling with empty sugared cans.

23. An apparatus for preparing and handling fruit for canning purposes comprising a peeling unit, a combined segmenting and packing unit, a combined can supply unit, wire baskets for peeled fruit, trays for the cans, and a system of interconnecting conveyors comprising means for carrying baskets of peeled fruit through the combined chemical and washing unit to the segmenting and packing unit and for returning the empty baskets to the peeling unit for delivering empty sugared cans to the packing stations, for delivering the filled cans to the scale table and for returning the empty can trays to a station for re-filling.

In testimony whereof I hereunto affix my signature in the presence of two witnesses.

EUGENE H. LEFEVRE.

Witnesses:
JAMES H. MARR,
D. P. WOLHAUPTER.